United States Patent [19]
Guyer

[11] 4,034,617
[45] July 12, 1977

[54] STEPPED BELTING SPLICE

[75] Inventor: Nathan E. Guyer, Stoneham, Mass.

[73] Assignee: American Biltrite Inc., Cambridge, Mass.

[21] Appl. No.: 651,860

[22] Filed: Jan. 23, 1976

[51] Int. Cl.² .................. F16G 1/00; F16G 5/00; B65G 15/14; B65G 15/30

[52] U.S. Cl. ................... 74/231 J; 198/844

[58] Field of Search ......... 74/231 N, 231 R, 231 P; 198/193, 165

[56] References Cited

U.S. PATENT DOCUMENTS

| | | | |
|---|---|---|---|
| 3,224,566 | 12/1965 | Elliott | 198/193 |
| 3,481,807 | 12/1969 | Kanamori | 198/193 X |
| 3,693,218 | 9/1972 | Jaubert et al. | 74/231 J X |

Primary Examiner—Leonard H. Gerin
Attorney, Agent, or Firm—Kenway & Jenney

[57] ABSTRACT

Conveyor belting ends, each comprising a pair of carcass plies separated by an intermediate elastomeric ply and enclosed by a pair of outer rubber plies, are spliced by removing material from various plies to expose one surface of each terminal portion of the carcass plies. The two belting ends are then interfitted, after the application of tie gum to exposed surfaces, such that each carcass ply terminal portion overlies the terminal portion of the associated carcass ply on the other belting end, thereby assuring two uninterrupted carcass plies at the longitudinal location on the belt where each carcass ply is severed.

4 Claims, 4 Drawing Figures

STEPPED BELTING SPLICE

BACKGROUND OF THE INVENTION

This invention relates to a method for splicing conveyor belting and to the belt construction resulting from such a splice. The present invention can be viewed as an improvement on the splicing arrangement described in U.S. (Elliott) Pat. No. 3,224,566, issued Dec. 21, 1965, assigned to the Assignee of the present invention, and incorporated herein by reference.

Conveyor belting is customarily spliced at the site where it is to be used, whether a new installation or a repair situation. Because of this, it is highly desirable that a suitable splice can be made without the necessity of special equipment. Nonetheless, the splice should be strong, of substantially uniform thickness with the remainder of the belt, and free from substantial surface irregularities. A common splice has been simply to butt-join the aligned plies of adjacent belt ends using an adhesive of some type, the series of such butt joints often being longitudinally offset one from another. This arrangement, while simple, produced a very weak splice.

The above-mentioned U.S. No. 3,224,566 teaches a splice which is strong and does not impair belt uniformity, but it requires the manufacture, and stocking, of a reinforcing insert piece that bridges the interruptions in the strength-producing plies of the belting. Accordingly, a principle object of the present invention is to provide a splicing arrangement which results in a desirable splice in terms of the criteria discussed above, but which avoids the logistics problems of obtaining, stocking, and distributing the inserts.

SUMMARY OF THE INVENTION

Briefly, the invention features a method for forming a splice between two ends of conveyor belting, each of the ends comprising at least two carcass plies, an elastomeric ply intermediate the carcass plies, and a pair of outer plies of rubbery compound covering the carcass plies. The splicing method comprises the steps of: removing segments of plies of each belting end to expose a first surface of each carcass ply, coating exposed ply surfaces of one of the belting ends with a layer of tie gum, interfitting the belting ends in a manner that each exposed carcass ply surface on each belting end faces, across the tie gum, the exposed carcass ply surface of the other belting end, and vulcanizing the belting throughout the region of that overlapping.

In another aspect, the invention features an improved splicing arrangement in conveyor belting that comprises at least two carcass plies, an elastomeric ply intermediate the carcass plies, and outer plies. The splice is provided in an area of the belting in which all plies are severed, thereby defining first and second belting ends. Each carcass ply of each belting end has a single surface at which a portion of the adjacent belting ply has been removed to expose that surface, each such surface of the first belting end overlapping such a surface of the second belting end with a layer of tie gum intermediate the surfaces of each overlapping pair.

BRIEF DESCRIPTION OF THE DRAWING

Other objects, features, and advantages of the invention will appear from the description below of a preferred embodiment which is shown in the accompanying drawing, in which the thicknesses of various belting plies have been exaggerated for clarity.

in the drawing.

DETAILED DESCRIPTION OF A PARTICULAR PREFERRED EMBODIMENT

Figure 1:
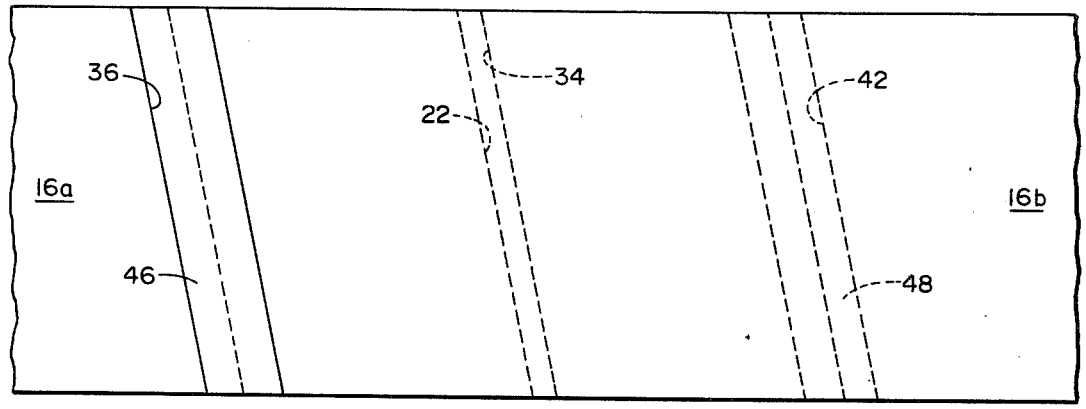
FIG. 1 is a plan view of a piece of the belting incorporating a splice according to the present invention.

Referring to the drawing, the illustrated belting is formed as a five-ply laminate. To distinguish between common features of the right and left segments of belting to be joined by the splice (which are shown separately in FIGS. 3 and 4), the suffix $a$ is used with reference numerals referring to the left end portion of the belt and the suffix $b$ applied to the right end. Since in their basic construction the two ends are, of course, identical, as to some features a description of only one such end will be given.

Tensile strength is imparted to the belting by two carcass plies $10a$ and $12a$. These plies typically comprise sheets of strong, tough textile fabric coated with adhesive and impregnated with rubber of synthetic resin. A layer $14a$ of rubber composition or other elastomeric material lies intermediate the carcass plies and is bonded thereto by vulcanization or an adhesive. Outer cover plies $16a$ and $18a$ are bonded in a conventional manner to the internal sandwich consisting of the carcass plies and the intermediate layer $14a$ and may be formed of a rubber composition or synthetic resin, according to the purpose for which the conveyor belt is intended.

Figure 3:
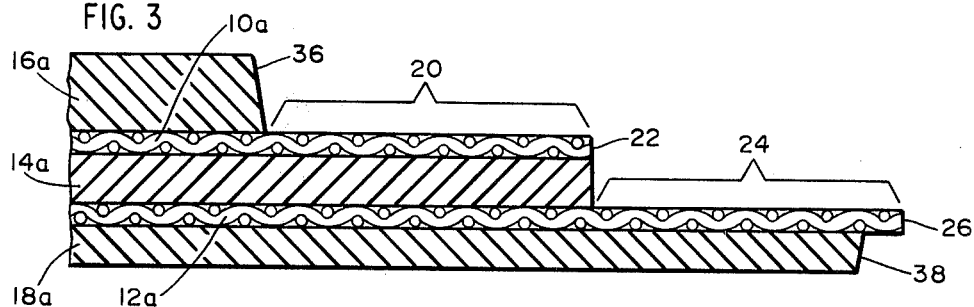
FIGS. 3 and 4 are longitudinal sections of the two belting ends as prepared, according to the present invention, for splicing.
Figure 4:
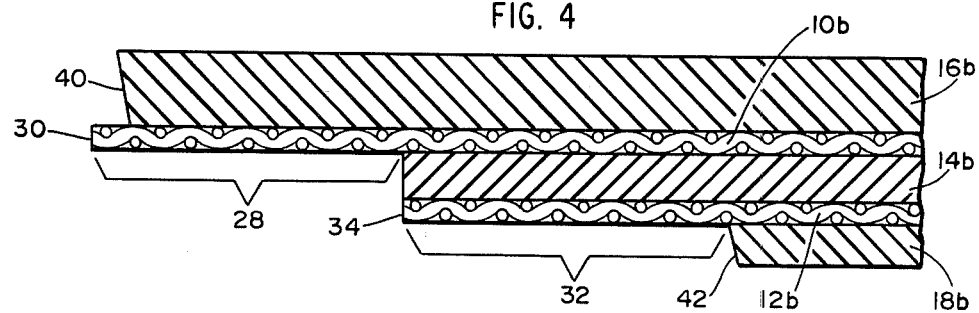

FIGS. 3 and 4 illustrate initial steps in the preparation for the splicing of two belting ends, each having the structure just described. As is evident from those figures, sections of the various plies have been removed as a preliminary step in the splicing. As a result of the removal of ply portions, the carcass plies $10a$ and $12a$ (FIG. 3) have terminal segments 20 and 24 adjacent the severed carcass ply ends 22 and 26, their upper surfaces exposed and in an offset, or stepped, relation to each other. Lower surfaces of terminal portions 28 and 32 of carcass plies $10b$ and $12b$ on the other belting end (FIG. 4) are also exposed adjacent severed carcass ply ends 30 and 34. The cover plies of each belting end are cut back to surfaces 36, 38, 40, 42 for purposes discussed below.

Figure 2:
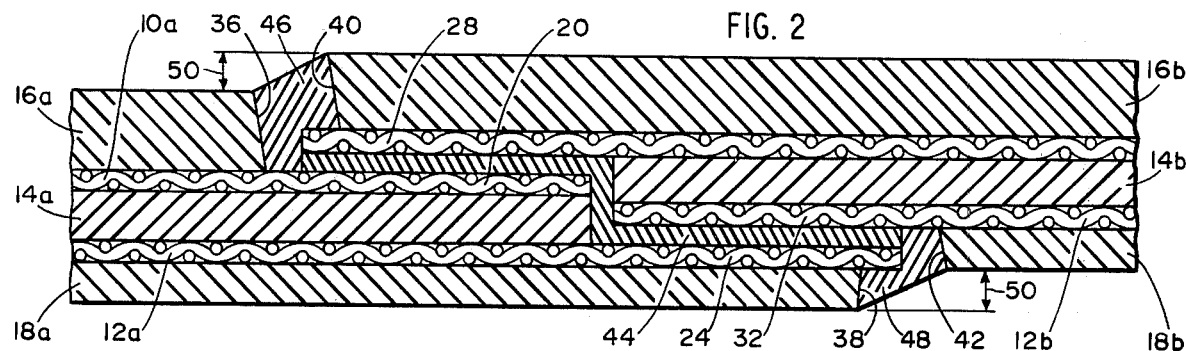
FIG. 2 is a corresponding longitudinal section.

Referring to FIG. 2, it will be seen that a coating of conventional tie gum 44 is provided in the final splice for bonding the carcass plies to each other. To complete the splice, conventional insert strips 46 and 48 (typically an uncured rubber compound) are inserted between the end surfaces 36, 40 of plies $16a$ and $16b$ and end surfaces 38, 42 of plies $18a$, $18b$ respectively. Subsequent vulcanization of the entire splice region, under pressure exerted by a conventional clamping arrangement, causes the insert strips 46 and 48 to flow and substantially fill the voids intermediate the cover ply end surfaces in the manner indicated in FIG. 2.

As is evident from FIG. 1, all ply edges (e.g., edges 22, 26, 36, and 38 of the left belt end shown in FIG. 3) are cut on a bias, as is conventional, to distribute forces experienced by the splice as the belting passes over a pulley.

The regions of the splice in the belting is indicated in FIG. 1 and extends between the end faces 36 and 42 of cover plies 16a and 18b, respectively. In a typical splice construction, the length of the terminal portions 24, 28 of the carcass plies 12a, 10b will be about 15 inches and the length of terminal portions 20, 32 will be about 17.5 inches. The entire length of the splice will thus be about 35 inches.

Referring to FIG. 2, it will be seen that in the completed splice each carcass layer of each belting end is overlapped by the associated carcass layer of the other belting end (i.e., carcass plies 10a and 10b overlap and carcass plies 12a and 12b overlap). This overlapping, of course, provided more strength than the prior art butt joints. Additionally, the overlapping is achieved using only continuous segments of the carcass plies of the two belting ends. The special inserts as required by the above-mentioned U.S. Pat. No. 3,244,566 are not required. As is also evident from FIG. 2, at the location of each cut end of a carcass ply there are two other uninterrupted carcass plies to maintain the belting strength at that location.

While there is a surface irregularity 50 in the belting at each longitudinal end of the spliced region, it amounts to only about 7/64 inch per lineal foot in the worst instance in a typical spliced belt. (The irregularity is exaggerated in the drawing because of exaggerated belting dimensions.)

While it should be understood that the features of the present invention can be used with a wide variety of belting constructions and compositions, a particular example is given below.

EXAMPLE

The longitudinal dimensions of the splicing regions given above, with an overall length of 35 inches, were employed. The belting was a five-ply laminate construction such as shown in FIG. 2 and is available under the designation CE 1602 from the Boston Industrial Products Division of Americal Biltrite, Inc., Cambridge, Mass. In this belting, the carcass plies have a thickness of substantially 0.030 inch and are separated by an intermediate layer of conventional belting center ply, or skim coat, having a thickness of about 0.065 to 0.070 inch. The top and bottom cover plies have a thickness of 3/16 inch and 1/16 inch, respectively.

The various plies of such belting were peeled and cut to provide a sectional configuration of two belting ends as shown in FIGS. 3 and 4 and were bias cut across the belt as shown in FIG. 1. The exposed surfaces of one belting end were coated with a rubber cement and then coated with tie gum to a thickness of 0.010 inch (see layer 44 of FIG. 2). After interfitting of the belting ends, the surfaces between cover ply edges 36, 40 and 38, 42 were coated with a rubber cement and uncured rubber composition strips were inserted. The splice region was then vulcanized by application of mechanical pressure and heat.

While a particular preferred embodiment of the present invention has been illustrated in the accompanying drawing and described in detail herein, other embodiments are within the scope of the invention and the following claims.

What is claimed is:

1. The method of forming a splice between first and second ends of conveyor belting each comprising at least two carcass plies, an elastomeric ply intermediate said carcass plies, and outer plies of rubbery compound covering the carcass plies, the method comprising the steps of
   a. removing in a stepped pattern segments of plies of the first belting end to expose a first surface of each carcass ply of first belting end,
   b. removing in a stepped pattern segments of plies of the second belting end to expose a second surface of each carcass ply of said second belting end,
   c. coating exposed ply surfaces of one of said belting ends with a layer of tie gum,
   d. interfitting said belting ends such that each exposed surface carcass ply of the first belting end faces across said layer of tie gum, the exposed carcass ply surface of the second belting end, and
   e. vulcanizing the belting throughout the region of said overlapping.

2. The method of claim 1 wherein said steps (a) and (b) include cutting away said outer plies of each belting end to a degree such that aligned outer plies of said two belting ends are spaced apart after said step (d), the method further including the step, prior to said step (e), of filling the void between the spaced apart outer plies with an uncured rubbery compound.

3. In conveyor belting comprising at least two carcass plies of elastomeric ply intermediate said carcass plies, and outer plies of rubbery compound; an area in which all plies are severed thereby defining first and second belting ends spliced together in said area, each carcass ply of each belting end having a single surface at which a portion of the adjacent belting ply has been removed, each such surface of said first belting end facing the same direction and each such surface of said second belting end facing the same direction, each such surface of said first belting end overlapping such a surface of said second belting end, a layer of tie gum intermediate the surfaces of each overlapping pair.

4. In conveyor belting, a splice as defined in claim 3 wherein aligned severed ends of said outer plies are spaced apart longitudinally of the belting, the volume between each pair of spaced apart outer ply ends being filled with a rubber compound.

* * * * *